US008949091B2

(12) United States Patent
Bhagwat et al.

(10) Patent No.: US 8,949,091 B2
(45) Date of Patent: Feb. 3, 2015

(54) METHOD AND SYSTEM FOR THERMAL MANAGEMENT BY QUANTITATIVE DETERMINATION OF COOLING CHARACTERISTICS OF DATA CENTER

(75) Inventors: Harshad Girish Bhagwat, Pune (IN); Amarendra Kumar Singh, Pune (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 566 days.

(21) Appl. No.: 13/234,763

(22) Filed: Sep. 16, 2011

(65) Prior Publication Data

US 2012/0232877 A1    Sep. 13, 2012

(30) Foreign Application Priority Data

Mar. 9, 2011  (IN) .......................... 652/MUM/2011

(51) Int. Cl.
| | | |
|---|---|---|
| *G06G 7/48* | (2006.01) | |
| *G06G 7/56* | (2006.01) | |
| *G06F 17/50* | (2006.01) | |
| *G06G 7/62* | (2006.01) | |
| *H05K 7/20* | (2006.01) | |
| *G06F 11/30* | (2006.01) | |

(52) U.S. Cl.
CPC ........ *H05K 7/20836* (2013.01); *G06F 11/3062* (2013.01); *G06F 17/50* (2013.01); *Y02B 60/188* (2013.01); *G06F 17/5009* (2013.01); *G06F 2217/16* (2013.01); *G06F 2217/80* (2013.01)
USPC ............................................... 703/5; 703/13

(58) Field of Classification Search
CPC . G06F 17/5009; G06F 17/50; G06F 11/3062; Y02B 60/188
USPC ........................................................ 703/5, 13
See application file for complete search history.

(56) References Cited

U.S. PATENT DOCUMENTS

| | | | |
|---|---|---|---|
| 7,051,946 B2 | 5/2006 | Bash et al. | |
| 7,558,649 B1 * | 7/2009 | Sharma et al. | ................ 700/282 |
| 7,620,613 B1 * | 11/2009 | Moore et al. | ..................... 706/62 |
| 7,979,250 B2 * | 7/2011 | Archibald et al. | ................ 703/5 |
| 7,991,592 B2 | 8/2011 | Vangilder et al. | |
| 8,594,985 B2 * | 11/2013 | Hamann et al. | ................... 703/9 |
| 8,639,482 B2 * | 1/2014 | Rasmussen et al. | .............. 703/5 |
| 2005/0023363 A1 * | 2/2005 | Sharma et al. | ................ 236/49.3 |
| 2010/0076608 A1 * | 3/2010 | Nakajima et al. | ............. 700/278 |
| 2011/0203785 A1 * | 8/2011 | Federspiel et al. | ............ 165/200 |

OTHER PUBLICATIONS

Qinghui Tang, NPL, "Sensor-Based Fast Thermal Evaluation Model for Energy Efficient High-Performance Datacenters", Oct 2006.*
Tang, Qinghui et al. "Sensor-based fast thermal evaluation model for energy efficient high-performance datacenters" International Conf. Intelligent Sensing Info. Proc. (ICISIP2006), Dec. 2006.

\* cited by examiner

*Primary Examiner* — Omar Fernandez Rivas
*Assistant Examiner* — Angel Calle
(74) *Attorney, Agent, or Firm* — Oliff PLC

(57) ABSTRACT

The invention provides a method and system for quantitative determination of cooling characteristics of a data center by calculating thermal influence indices. The invention further provides a method and system for providing effective thermal management in a data center using quantitative determination of cooling characteristics of a data center.

12 Claims, 12 Drawing Sheets

US 8,949,091 B2

METHOD AND SYSTEM FOR THERMAL MANAGEMENT BY QUANTITATIVE DETERMINATION OF COOLING CHARACTERISTICS OF DATA CENTER

FIELD OF THE INVENTION

The present invention relates to thermal management of data centers and it particularly determines cooling characteristics of a data center. More particularly the invention relates to quantitative determination of cooling characteristics of a data center by calculating thermal influence indices.

BACKGROUND OF THE INVENTION

A data center typically contains electronic equipments such as servers, telecom equipments, networking equipments, switches and other electronic equipments which are arranged on racks or frames. The heat generated by such electronic components is cooled with the help of cooling units. Typically, the cooling units are computer room air conditioners (CRAC) or computer room air handlers (CRAH) which supply cold air for cooling. More advanced cooling units such as in-row coolers, rear door coolers, liquid cooled cabinets and chip cooling techniques have now come into practice.

Data centers are considered as energy guzzlers. With the drastic increase in energy cost, the huge energy consumption is one of the major concerns of the data center managers. Power consumed by cooling equipments contributes to a major portion of the total data center power consumption. The main challenge is to ensure safety of electronic equipments by ensuring appropriate temperatures in the data center and at the same time ensuring optimum cooling efficiency of the data center. Due to poor design of the data center, data center mangers may face a lot of problems such as hot spots, low tile flow rates and so on. General measures which can be taken to handle the problem are decreasing supply temperature of cooling units, increasing cooling capacity near the problem area and so on. These measures may decrease the cooling efficiency. Cooling capacity of the data center is designed and typically run for maximum heat load conditions. In practice, data centers rarely operated at maximum conditions. Typically, cooling units are controlled according to heat loads in a very elementary manner. Workload placement decisions are taken without considering cooling related issues such as cooling availability, inlet temperatures and so on. All these practices lead to poor cooling efficiency. In addition, due to the obvious urge to increase space utilization of the data center, consolidation and virtualization exercises are being carried out. Existing cooling infrastructure of a data center may not be sufficient to take concentrated heat loads resulting due to consolidation and virtualization. Data center managers face number of such major challenges in thermal management of data centers.

Various attempts are being made to minimize the cooling costs of the data center. Some of these attempts include transformation of old data centers, efficient design of new data centers, dynamic controlling of cooling units, consolidation and temperature aware workload scheduling. Efficient design of data center includes proper arrangement of racks, tiles, CRACs etc., adequate plenum depth, use of airflow management techniques such as aisle containment, CRAC operation moderation etc. Problems which are being faced in old data centers such as hot spots and low cooling efficiency have been solved by carrying out design and operational changes. Efficient control schemes have been developed to control parameters of CRAC such as supply temperature, supply flow rate or tile flow rates in accordance to changes in heat generation, temperature, pressure and airflows in the data center. These control schemes make CRAC run at optimum efficiency while maintaining satisfactory temperatures in the data center at the same time. Different algorithms for workload placements have been developed which take cooling related parameters such as recirculation, CRAC capacities into account while executing placement requests. Numerical models such as CFD models and data based models using neural networks are being used to facilitate these attempts.

All these attempts demand complete understanding of cooling characteristics of the data center. This determination of cooling characteristics may include quantification of hot air recirculation, cold air short-circuiting, loading of each CRAC, influence region of CRAC etc. Causal relationship between various components in the data center is also essential. For example, design optimization of a data center is often carried out to minimize the wastage of cold air due to short circuiting. Each CRAC would be receiving hot air as well as short-circuited cold air. In such scenario, it would be of value to know, for example, the individual contributions of various CRAC units in the short circuited air reaching a particular CRAC. In another case, it may be of use to know the contribution of a particular CRAC in overall flow at a cold tile. Hence, it is necessary to quantify various phenomena occurring in the data center and set a causal relationship between various components in the data center with respect to influence of one component on the other.

To minimize of the cooling cost there is a need for complete understanding of cooling characteristics of the data center. However, various performance metrics have been proposed to analyze cooling characteristics of the data centers. But they are not efficient enough to characterize the cooling profile of the data center. Some of the systems and methodologies which form the prior art are given below:

U.S. Pat. No. 7,051,946B2 to Bash, et al. discloses an air re-circulation index. The patent discusses about an index of air re-circulation in a data center having one or more racks. The index is used to determine the level of hot air re-circulation into cold air streams, delivered to one or more racks. The utility of the index has been shown in design optimization of the data center. The same air-recirculation index has been discussed by Sharma, at al. In "Dimensionless parameters for evaluation of thermal design and performance of large-scale data centers" and by Schmidt, at al in "Challenges of data center thermal management" The air re-circulation index has very limited scope. A data center may have various components such as CRAC, tile, sensors etc and various phenomena other than hot air recirculation associated with them such as cold-air short circuiting etc. Due to limited information about cooling characteristics given by air re-circulation index, design optimization carried out based on air re-circulation index alone may not provide the best design.

US20080174954A1 to VanGilder, et al. provides a system and method for evaluating equipment rack cooling performance. The problem addressed particularly relates to defining capture index (CI) as airflow based index which is based upon airflow patterns associated with the supply of cold air to, or the removal of hot air from, a rack. CI also has very limited scope. A data center may have various components such as CRAC, tile, sensors etc and various phenomena other than hot air recirculation associated with them such as cold-air short circuiting etc. The use of CI typically demands division of the data center into clusters and typically considers only local cooling devices. The CI is defined in terms of flow rates only and does not consider temperature or heat. CI has been shown typically applicable for design optimization of data center. It can also be used for identifying the best places for addition of new heat load and predicting temperature at some locations such as return air temperature at coolers. These applications are based on limited information about cooling characteristics given by CI hence may not provide best design.

US2010076608A to Nakajima, et al. provides a system and method for controlling air conditioning facilities, and system and method for power management of computer room. The problem addressed particularly relates to control cooling in data center in order to minimize cooling power. Further it is concerned with characterizing cooling in the data center wherein, some temperature sensitivity coefficients are defined. These temperature sensitivity coefficients also have limited scope. They typically quantify correlation between CRAC and racks and try to quantify cooling characteristics of the data center. Further, their utility is limited to controlling of cooling provisioning in the data center only.

Tang et al. In "Sensor-based fast thermal evaluation model for energy efficient high-performance datacenters" discloses cross-interference coefficients which quantify hot air exchange between various servers. The indices are used for fast temperature prediction at inlets of the servers for different power consumption profiles of the servers. These coefficients cannot be used for predicting temperatures at other locations in the data center. Moreover, these coefficients cannot be used to predict temperatures at inlets of servers for different operating parameters of CRAC such as CRAC supply temperature, CRAC flow rate etc.

U.S. Pat. No. 7,620,613B to Moore, et al, discloses thermal management of data centers. The problem addressed particularly relates to the estimation of temperatures at inlets of equipments from temperatures detected inside the equipments and heat generated by the equipments. Further it generates models for predicting temperatures at inlets of racks from heat generated and temperature sensor placed inside a server. So the methodology used for this prediction is from inside the servers. This methodology doesn't involve detailed flow and thermal computation in the whole data center. Hence this methodology fails to quantify temperatures of other locations in the data center or for different operating parameters of CRAC such as CRAC supply temperature, CRAC flow rate etc.

US20090150123A1 to Archibald, et al. provides a method of designing the data center using a plurality of thermal simulators. The problem addressed particularly relates to simulating conditions in the data center by physically laying out thermal simulators, measuring actual temperatures in this simulated environment and checking whether the proposed layout is suitable. Further it is concerned with defining some gross and preliminary indices such as average rack temperature difference etc. This method determined cooling characteristics of the data center by physically laying out simulators which is a tedious and time consuming task to be implemented for a large scale data center. Moreover, some of important cooling characteristics of the data center cannot be determined using these gross and preliminary indices based on temperature measurements alone.

The above mentioned prior arts failed to determine all the cooling characteristics of a data center due to their limited scope. It discloses a set indices the indices attempting to minimize cooling cost such as design optimization, dynamically controlling cooling infrastructure and dynamic workload placements and fast temperature prediction. However, these are based on inadequate information regarding cooling characteristics and hence can not be considered a useful method.

Influence indices disclosed in the present invention are functions of both airflow and temperature. So they provide a picture of the cooling performance of a data center. They quantify various phenomena occurring in the data center and quantify the amount of influence each component will have on all the components. This complete determination of cooling characteristics can be used to determine reasons behind problems such as hot spots and cooling inefficiencies. Hence, optimization carried out using influence indices will result in configuration of the data center which is optimized from all aspects. The causal relationship set up by influence indices can also be used to pinpoint the locations best suited for increasing heat load from cooling perspective. Moreover, it can also be used for fast prediction of temperatures at any point at various operating parameters on CRAC and power consumption of racks in the data center. This fast prediction of temperatures completes calculations within seconds compared to hours required for CFD calculations.

Thus, in the light of the above mentioned background art, it is evident that, there is a need for a solution that can provide a method for complete determination of cooling characteristics of a data center by calculating thermal influence indices which are based on information related to configuration of data center, air flow, temperature and heat pertaining to the source and target components in a data center.

Hence, due to the drawbacks of the conventional approaches there remains a need for a new solution that can provide a method and system for complete determination of cooling characteristics of a data center.

OBJECTIVES OF THE INVENTION

In accordance with the present invention, the primary objective is to provide a method and system for characterization of cooling performance of a data center.

Another objective of the present invention is to provide a method and system for quantitative determination of cooling characteristics of a data center by calculating thermal influence indices.

Another objective of the present invention is to provide a method and system for calculating thermal influence indices, wherein thermal influence indices calculations are based on information related to configuration of data center, air flow, temperature, heat pertaining to the source and target components in a data center.

Yet another objective of the present invention is to provide a method and system for providing effective thermal management in a data center using quantitative determination of cooling characteristics of a data center.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present invention provides a method and system for characterization of cooling performance of a data center.

One aspect of the invention is to determine cooling characteristics of a data center.

Another aspect of the invention is to determine cooling characteristics of a data center by calculating thermal influence indices.

Another aspect of the invention is to calculate thermal influence indices, wherein thermal influence indices calculations are based on information related to configuration of data center, air flow, temperature and heat pertaining to the source and target components in a data center. These indices quantify thermal influence of source components on target components. This influence can be realized in many ways such as static type. This particular type of influence indices is studied in the present work. The influence indices for a given pair of source and target components can be defined in terms of flow, temperature, and heat related information pertaining to the components in many ways. Each of these indices provides vital information regarding cooling characteristics of the data center.

In yet another aspect of the invention is to provide effective thermal management in a data center using quantitative determination of cooling characteristics of a data center. The information about cooling characteristics of the data center gathered from analysis of thermal influence indices can be used to exactly determine the cause behind problems such as hot spots and cooling inefficiencies. They can be used as objective functions for optimization of configuration of the data center. The indices can pinpoint the areas best suited for increasing heat load from cooling perspective. The indices can also be used to for fast prediction of temperatures in the data center leading to optimization of thermal management in a data center.

The above said method and system are preferably to determine cooling characteristics of a data center but also can be used for many other applications.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Figure 1:
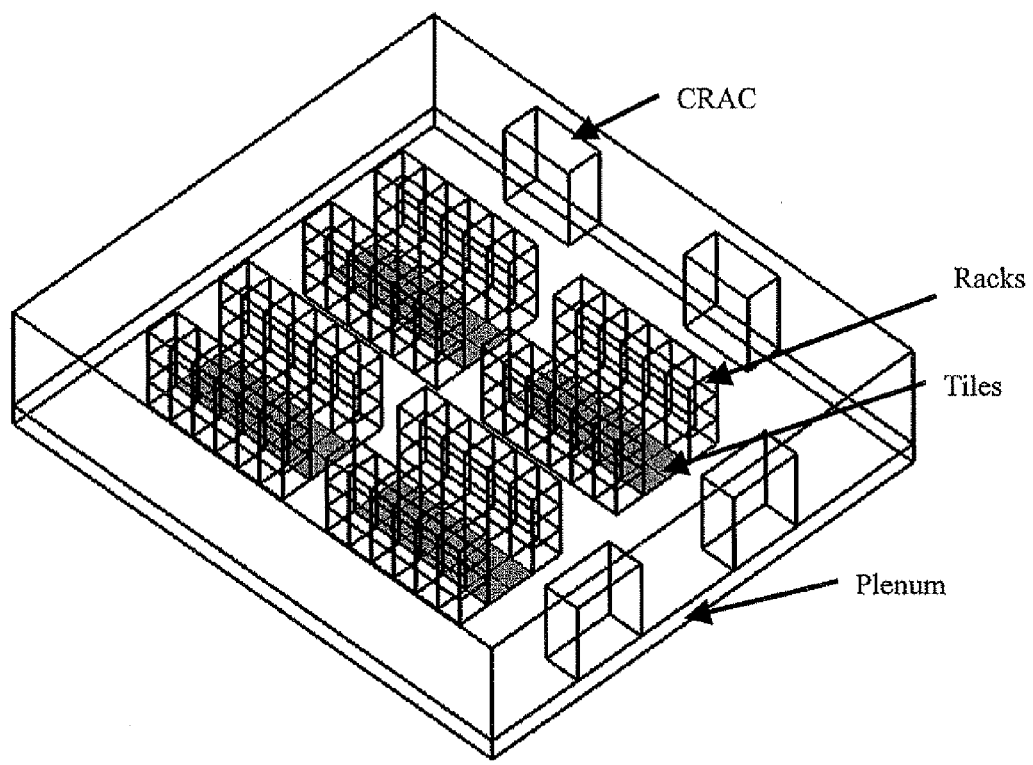
FIG. 1 Typical data center (isometric view)
FIG. 2 Typical data center (top view)
FIG. 3 Flow diagram showing typical airflow patterns in a data center
FIG. 4 Flow diagram showing typical airflow pattern related to a CRAC
FIG. 5 Flow diagram showing typical airflow pattern related to a rack
FIG. 6 Flow diagram showing determination of cooling characteristics of a data center
FIG. 7 Flow diagram showing calculation of influence indices using air tracer method
FIG. 8 Flow diagram showing calculation of influence indices using heat tracer method
FIG. 9 Flow diagram showing determination of cause behind thermal problem
FIG. 10 Flow diagram showing optimization of configuration of a data center
FIG. 11 Flow diagram showing evaluation of capacity of current configuration to take up increased heat load
FIG. 12 Flow diagram showing fast prediction of temperatures in a data center

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The present invention enables a method and system for determining cooling characteristics of data center for providing effective thermal management.

The present invention provides a method for determining cooling characteristics of data center for providing effective thermal management, wherein the said method comprises the processor implemented steps of:
 a. selecting the configuration of data center using design and operational parameters;
 b. selecting at least one pair of components in data center and further defining the influence indices for the said pair of components;
 c. calculating the defined influence indices for the said pair of components;
 d. normalizing calculated influence indices using normalization methods;
 e. analyzing normalized influence indices by comparing normalized influence indices with other similar influence indices or by comparing with thresholds;
 f. determining cooling characteristics of the data center and identifying the thermal inefficiencies in the data center using analysed influence indices;
 g. optimizing configuration using design and operational parameters of the data center for providing effective thermal management; and
 h. pinpointing the areas best suited for increasing heat load from cooling perspective and predicting temperatures in the data center.

The present invention also provides a system for determining cooling characteristics of a data center for providing effective thermal management, wherein the said system is comprised of:
 a. means for selecting the configuration of data center using design and operational parameters;
 b. means for selecting at least one pair of components in data center and further defining the influence indices for the said pair of components;
 c. means for calculating the defined influence indices for the said pair of components;
 d. means for normalizing calculated influence indices using normalization methods;
 e. means for analyzing normalized influence indices by comparing normalized influence indices with other similar influence indices or by comparing with thresholds;
 f. means for determining cooling characteristics of the data center and identifying the thermal inefficiencies in the data center using analysed influence indices;
 g. means for optimizing configuration using design and operational parameters of the data center for providing effective thermal management; and h. means for pinpointing the areas best suited for increasing heat load from cooling perspective and predicting temperatures in the data center.

The present invention provides a method and system for determining cooling characteristics of a data center providing effective thermal management. More particularly the invention determines cooling characteristics of a data center by calculating thermal influence indices, wherein thermal influence indices calculations are based on information related to configuration of data center, air flow, temperature and heat pertaining to the source and target components in a data center.

The present application uses specific terminologies such as CRAC, rack, etc. only for simplicity. The subject matter of the present application is applicable to servers or any other heat generating equipments, groups of equipments, group of racks holding these equipments, any cooling units such as in-row coolers, any type of air delivery mechanism such as overhead ducts etc. Moreover, the fundamental notion of influence of one component on another component is applicable to any type of electronic equipments arranged in any fashion, any type of cooling fluid, any type of delivery mechanism and any type of cooling units. Appropriate changes in the definitions and methods of determination may be needed in some cases.

A data center has various components such as CRACs, racks, tiles, baffles, sensors etc that are thermally interconnected. All the components have more or less 'thermal influence' on each of the other components. The components of a data center may be influencing each other in an extremely complex way. As a matter of fact, conditions such as flow, temperature at every point in the data center are due to the influence of various components in the data center. Complete understanding of cooling characteristics of a data center demands complete understanding and quantification of all these influences. Influence indices presented in the present invention have inherent ability to quantify this thermal influence.

A state of the data center can be characterized based on its configuration. A configuration of the data center constitutes two sets of parameters: design parameters and operating parameters. Design parameters may include parameters associated to cooling infrastructure, CRAC, racks, heat generating equipments in racks, placement of components such as CRAC, tiles, plenum, racks, and placement of airflow altering components such as baffles or panels. For example, parameters associated to cooling units may include position of supply and return, dimensions associated to the cooling units such as height, width etc. Operating parameters may include supply temperature and flow rates of CRAC, actual power consumed by racks, airflow of racks or any other parameters associated which are changed dynamically during operation of the data center. The thermal influence and hence the influence indices between various components in the data center is quantitatively dependent on specific configuration of the data center.

The notion influence can be realized in two distinct ways. The notion 'influence' considered in this work can be called as a 'static influence'. In this type of realization, as-is state of the data center is considered. Large changes in conditions of source and target component are not made. Influence can be realized in dynamic sense. It can be regarded as influence of large changes in conditions of source component on the target component, e.g., the influence of change in position of CRAC on the rack inlet temperature. This type of influence indices will have different types of definitions and require different methods of determination. The influence indices studied hereafter are of static type.

The realization of thermal influence requires two components which can be named as source components and target component. The thermal influence and hence influence indices can be defined as thermal influence of source component on target component. The source components can be CRAC, racks, tiles or any other flow generating device (e.g. a fan) etc. The target component can be CRAC, racks, tiles or any other flow generating device e.g. a fan, a sensor. In fact, any point in the data center can be considered as a target component. Influence indices can be defined as influence of outlet of source component on inlet of target component. The components such as CRAC, rack or a fan have an inlet and an outlet. The inlet and outlet of a tile can be considered as planes where air enters the tile and the plane where air exits the tile. Components such as sensors or an arbitrary point in the data center are necessarily target components. The influence indices with such components can be defined as influence of outlet of source component on the sensor or the arbitrary point. Further discussion will explain some of the definitions of influence indices with some of source and target components in detail.

Figure 2:
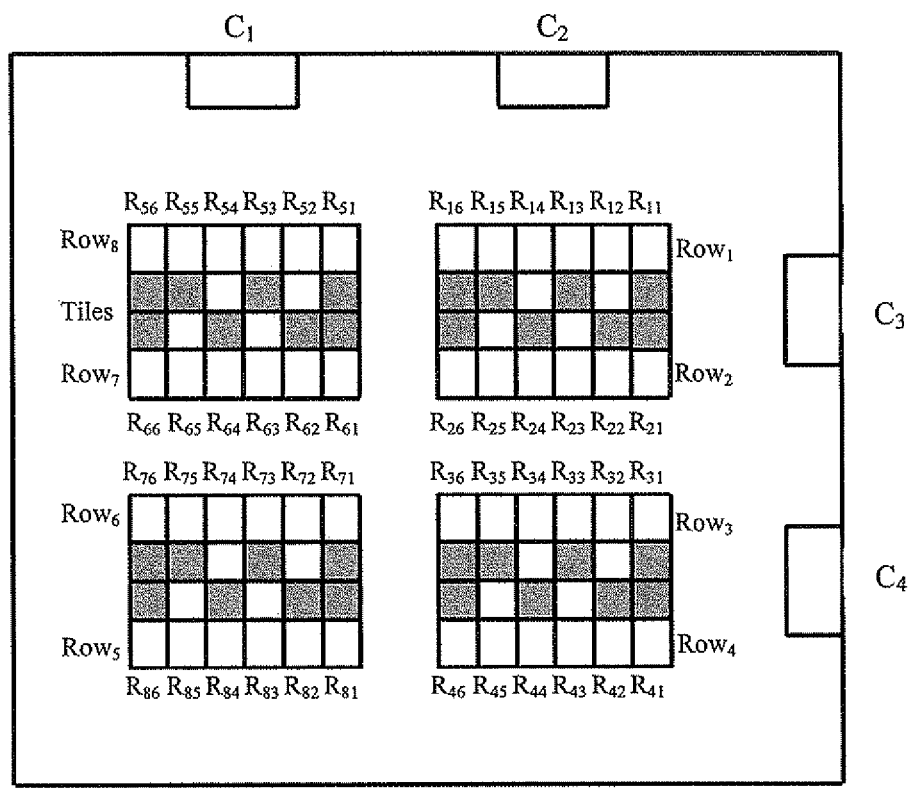

Referring to FIG. 1 is an isometric view and FIG. 2 is a top view of a typical data center. The data center contains racks housing various electronic and electric equipments and the racks are arranged in rows. The heat generated by the electronic and electric equipments is cooled by CRACs which are situated near periphery of the data center. These CRACs enable cold air to flow into the under-floor plenum. This cold air is delivered to intended places (e.g. fronts of racks) through tiles or vents. The equipments typically have fans for taking in cold air. This air picks up the heat generated and the hot air is exhausted. This hot air is returned back to CRACs. This discussion illustrates an example of cooling infrastructure in a typical data center. There are various other types of cooling infrastructures in practice.

Figure 3:
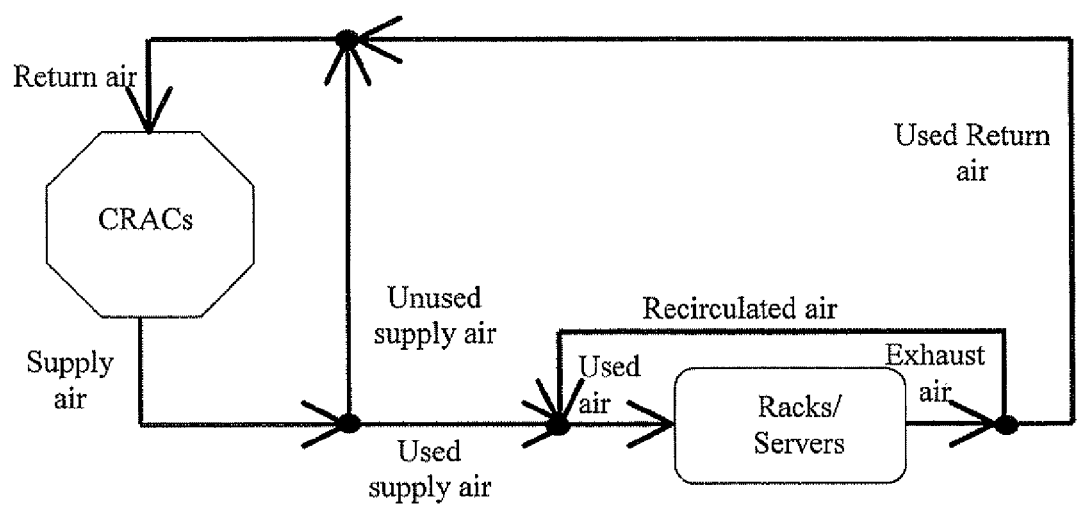

Referring to FIG. 3 is a flow diagram showing typical airflow patterns in a data center. CRACs provide cold air, called as supply air, a part of which is taken in by the racks. This is known as used supply air. The remaining air may pick up some heat from the ambient and return to the CRACs unused. This air is called as unused supply air. So the air supplied by CRAC is divided into the used supply air and unused supply air. Racks exhausts hot air which is called as exhaust air. Some of the exhaust air returns to the CRACs directly. This is called as used return air. Rest recirculates and is sucked again by other servers. This is called as recirculating air. So the exhaust air is split into return air and recirculating air. The air sucked by racks is called as used air. This is a mixture of used supply air and recirculating air. The air sucked by CRACs is called as return air and is a mixture of unused supply air and used return air. Ideally, unused supply air and recirculated air should be negligible. CRAC should be able to supply just enough supply air to meet the rack requirements and should be able to suck all the exhaust air without recirculation.

Figure 4:
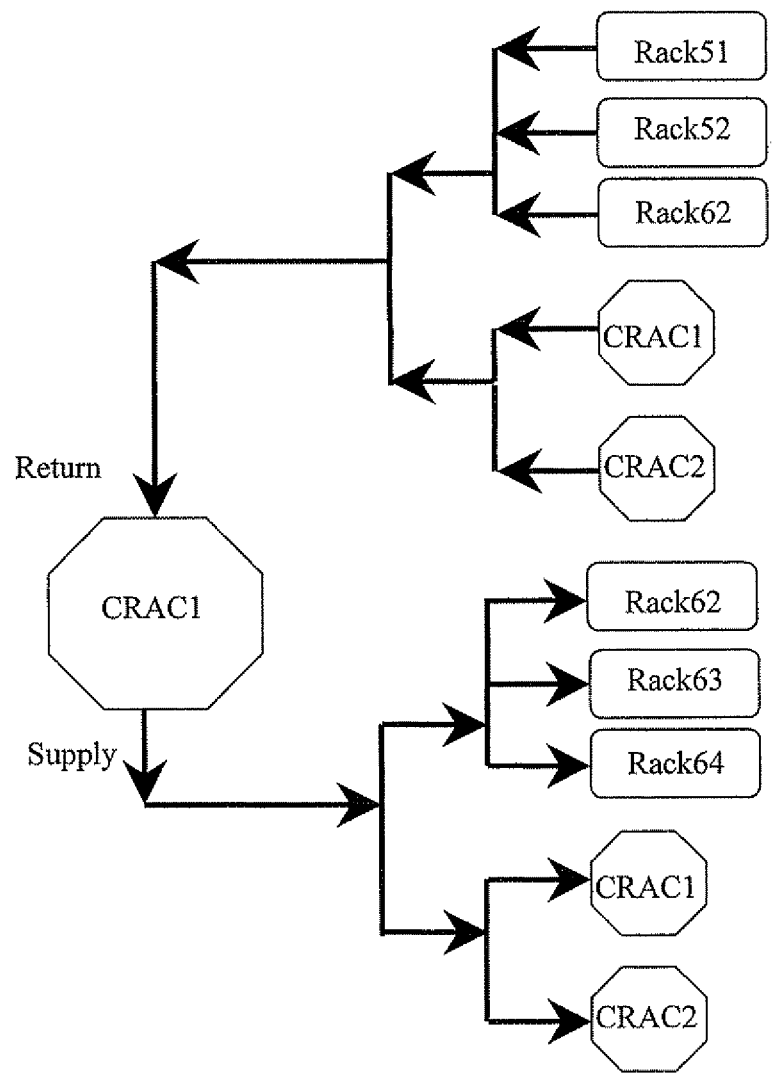
Figure 5:
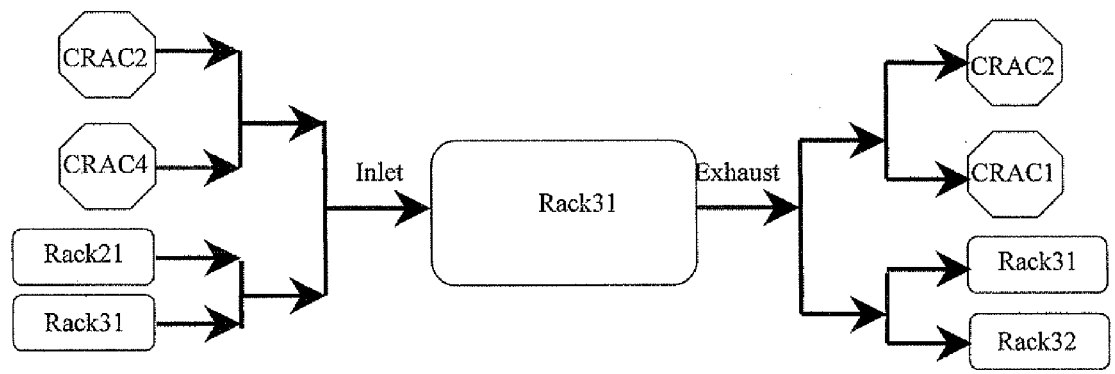

Airflow pattern related to individual CRAC is shown in FIG. 4. $CRAC_1$ provides supply air to only some of the racks and may receive return air from different racks. The unused supply air of $CRAC_1$ may return to any of the CRACs including itself. The unused supply air of other CRACs may return to $CRAC_1$. Schematic of typical airflow pattern is shown in the FIG. 5. $Rack_{31}$ may get cold air from more than one CRACs and may return exhaust air to different CRACs. $Rack_{31}$ may receive recirculated air from any of the racks including itself and it may supply some recirculated air to any of the racks including itself.

This supply and return of cold air is accomplished with the help of cooling infrastructures such as under-floor plenum, overhead plenum, ducts, tiles (vents), dampers etc. There may be sensors placed at various locations such as at inlets of racks, at returns of CRACs etc for monitoring thermal parameters in the data center.

These airflows occurring in the data center act as a medium for flow of heat. The heat flow ($\dot{Q}$) carried by airflow ($\dot{m}$) at temperature T can be calculated using Equation (1) stated below:

$$\dot{Q} = \dot{m} C_p T \quad \text{Equation (1)}$$

$C_p$ is specific heat of air at constant pressure at temperature T. $C_p$ can be assumed as constant for temperatures close to room temperature which are often encountered in data centers.

Hence heat flows can be associated with corresponding airflows and can have similar naming conventions that are used for airflows as explained above. For example, the heat flow carried by supply air of a CRAC can be called as supply heat of CRAC.

Figure 6:
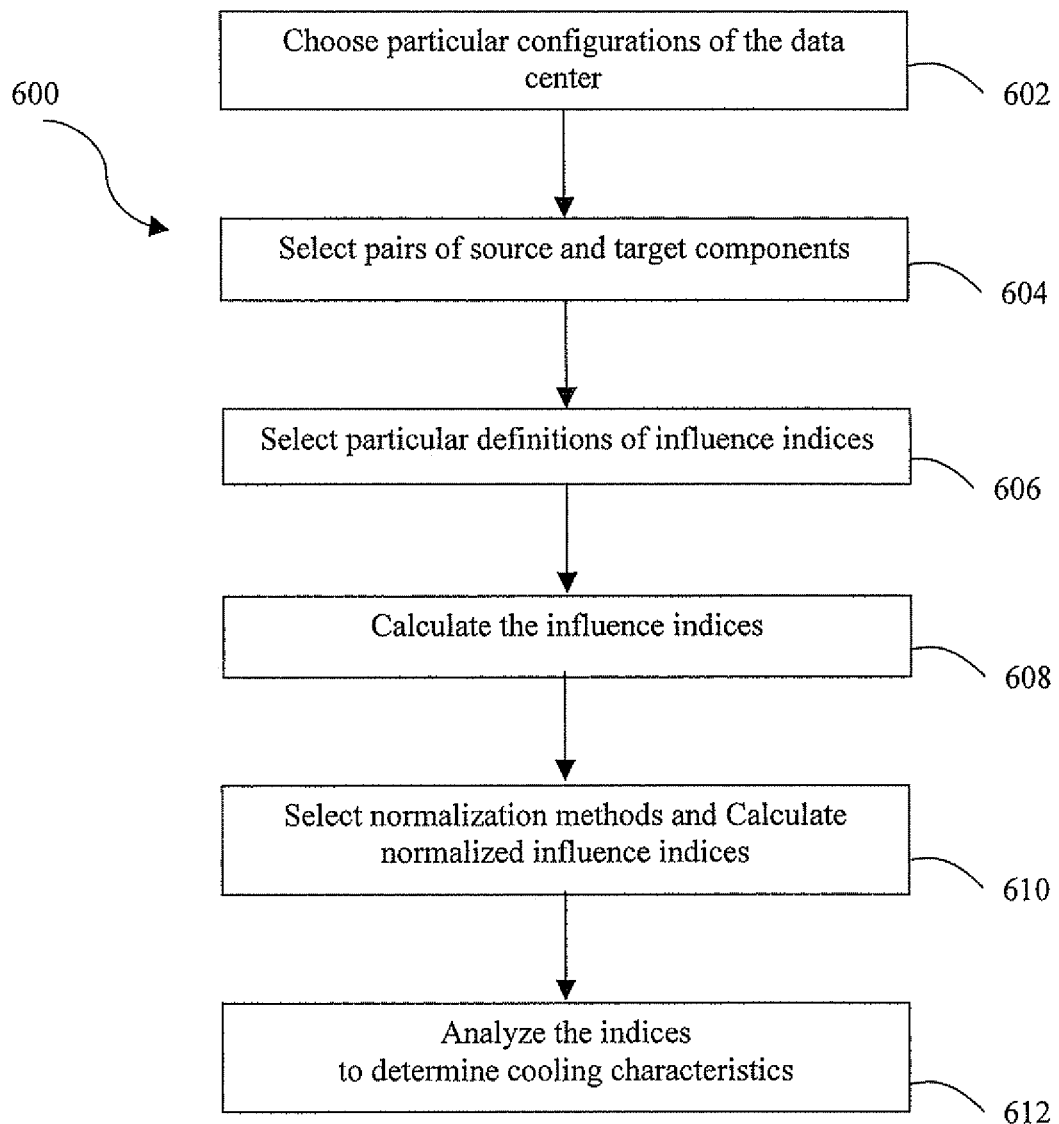

In one embodiment of the invention, cooling characteristics of the data center are determined. Referring to FIG. 6 is a flow diagram showing the method 600 for determining cooling characteristics of the data center. In the first step 602 of the process, particular configuration of the data center is selected. This selection of configuration includes selection of various design and operational parameters. In the next step 604 of the process, a pair of source and target components is selected in the data center. Many influence indices can be defined for a particular pair of source and target components. In the next step 606 particular definitions of influence indices are selected. There can be multiple methods of calculating influence indices. A particular method is selected and the selected influence indices are calculated in the next step 608. In the next step 610, particular normalization methods are selected and normalized influence indices are calculated. Normalization is done so that influence indices of similar type can be compared with each other and useful information about cooling characteristics can be obtained. If absolute values of indices are to be analyzed then no normalization method is to be selected in this step. The calculated influence indices provide specific information about the cooling characteristics of that particular configuration of the data center. In the next step 612, the influence indices are analyzed to determine cooling characteristics of the data center. This understanding of cooling characteristics can be useful in variety of applications as explained in later sections.

The influence indices are non-dimensional numbers and are defined as ratios of heat flows. For a given pair of source and target components, many influence indices can be defined by considering different heat flows in the numerator and denominator of the indices and can be analyzed using variety of normalizations. To demonstrate utility of influence indices, following sections explain definitions and meanings of some of the frequently used influence indices.

In the following sections, a data center with M CRACs and N racks is considered.

$C_i$ denotes $i^{th}$ CRAC $R_j$ denotes $j^{th}$ rack.

$\dot{m}$(source, t arg et) denotes mass flow supplied by source component to the target component $\dot{m}^{out}$(component) denotes mass flow at the outlet of a component $\dot{m}^{in}$(component) denotes mass flow at the inlet of a component $T^{out}$(component) denotes temperature of air at outlet of a component.

$T^{in}$(component) denotes temperature of air at inlet of a component.

$\dot{Q}$(source, t arg et) denotes heat flow associated with $\dot{m}$(source, t arg et)

$\dot{Q}^{out}$(component) denotes heat flow associated with $\dot{m}^{out}$(component)

$\dot{Q}^{in}$(component) denotes heat flow associated with $\dot{m}^{in}$(component)

These heat flows can be related to corresponding airflows and temperatures using Equation (1) as shown in Equation (2), (3) and (4) below:

$$\dot{Q}(\text{source}, t\text{ arg et}) = \dot{m}(\text{source}, t\text{ arg et}) \times C_p \times T^{out}(\text{source}) \quad \text{Equation (2)}$$

$$\dot{Q}^{out}(\text{component}) = \dot{m}^{out}(\text{component}) \times C_p \times T^{out}(\text{component}) \quad \text{Equation (3)}$$

$$\dot{Q}^{in}(\text{component}) = \dot{m}^{in}(\text{component}) \times C_p \times T^{in}(\text{component}) \quad \text{Equation (4)}$$

Some of the indices with source component as CRAC and target component as racks will now be explained. This set of indices quantifies the influence of the supply from individual or group of CRACs on inlets of individual or group of racks. Some of the useful indices are enlisted in Table 1.

TABLE 1

| Index and definition | Typical meaning | Example use |
|---|---|---|
| $\text{Inf}(C_i, R_j)/R_j = \dfrac{\dot{Q}(C_i, R_j)}{\dot{Q}^{in}(R_j)}$ | How much of used heat of $R_j$ has originated from $C_i$ | To detect CRACs which contribute considerably to used heat of $R_j$ |
| $\text{Inf}(C_i, R_j)/(C_i, R_{All}) = \dfrac{\dot{Q}(C_i, R_j)}{\sum_{j=1}^{N} \dot{Q}(C_i, R_j)}$ | How much of used supply heat of $C_i$ is sucked by $R_j$ | To compare different racks with respect to influence of $C_i$ |
| $\text{Inf}(C_i, R_j)/(C_{All}, R_j) = \dfrac{\dot{Q}(C_i, R_j)}{\sum_{i=1}^{M} \dot{Q}(C_i, R_j)}$ | How much of the used supply heat sucked by $R_j$ has originated from $C_i$. | To compare different CRACs with respect to influence over $R_j$ |

TABLE 1-continued

| Index and definition | Typical meaning | Example use |
|---|---|---|
| $\mathrm{Inf}(C_i, R_j)/C_i = \dfrac{\dot{Q}(C_i, R_j)}{\dot{Q}^{out}(C_i)}$ | How much of supply heat of $C_i$ is sucked by $R_j$ | To detect racks which receive considerable amount of supply heat of $C_i$ |
| $\mathrm{Inf}(C_{All}, R_j)/R_j = \dfrac{\sum\limits_{i=1}^{M} \dot{Q}(C_i, R_j)}{\dot{Q}^{in}(R_j)}$ | How much of used heat of $R_j$ has originated from all CRACs | To detect possible hot spots |
| $\mathrm{Inf}(C_i, R_{All})/C_i = \dfrac{\sum\limits_{j=1}^{N} \dot{Q}(C_i, R_j)}{\dot{Q}^{out}(C_i)}$ | How much of supply heat of $C_i$ is sucked by all racks | To detect utilization of supply heat of $C_i$ |

Some of the indices with source component as rack and target component as CRACs will now be explained. This set of indices quantifies the amount of influence of the exhausts from an individual or group of racks on individual or group of CRAC returns. Some of the useful indices are explained in Table 2.

TABLE 2

| Index and definition | Typical meaning | Example use |
|---|---|---|
| $\mathrm{Inf}(R_j, C_i)/R_j = \dfrac{\dot{Q}(R_j, C_i)}{\dot{Q}^{out}(R_j)}$ | How much of exhaust heat from $R_j$ is sucked by $C_i$ | To detect CRACs which receive considerable amount of exhaust heat of $R_j$ |
| $\mathrm{Inf}(R_j, C_i)/(R_{All}, C_i) = \dfrac{\dot{Q}(R_j, C_i)}{\sum\limits_{j=1}^{N} \dot{Q}(R_j, C_i)}$ | How much of used return heat of $C_i$ is exhausted by $R_j$ | To compare different racks with respect to influence on $C_i$ |
| $\mathrm{Inf}(R_j, C_i)/(R_j, C_{All}) = \dfrac{\dot{Q}(R_j, C_i)}{\sum\limits_{i=1}^{M} \dot{Q}(R_j, C_i)}$ | How much of the used return heat exhausted by $R_j$ has returned to $C_i$. | To compare different CRACs with respect to influence of $R_j$ |
| $\mathrm{Inf}(R_j, C_i)/C_i = \dfrac{\dot{Q}(R_j, C_i)}{\dot{Q}^{in}(C_i)}$ | How much of return heat of $C_i$ is exhausted by $R_j$ | To detect racks which return considerable amount of return heat to $C_i$ |
| $\mathrm{Inf}(R_j, C_{All})/R_j = \dfrac{\sum\limits_{i=1}^{M} \dot{Q}(R_j, C_i)}{\dot{Q}^{out}(R_j)}$ | How much of exhaust heat of $R_j$ has returned to all CRACs | To detect possible racks which cause recirculation of exhaust heat |
| $\mathrm{Inf}(R_{All}, C_i)/C_i = \dfrac{\sum\limits_{j=1}^{N} \dot{Q}(R_j, C_i)}{\dot{Q}^{in}(C_i)}$ | How much of return heat of $C_i$ is exhausted by all racks | To detect contribution of used return heat in return heat of $C_i$ |

Some of the indices with source component and target component as racks will now be explained. This set of indices quantifies how much exhausts of an individual or group of racks influence inlets of an individual or group of racks. It includes a special case of influence of a given rack on itself. Some of the useful indices are explained in Table 3.

TABLE 3

| Index and definition | Typical meaning | Example use |
|---|---|---|
| $\mathrm{Inf}(R_i, R_j)/R_j = \dfrac{\dot{Q}(R_i, R_j)}{\dot{Q}^{in}(R_j)}$ (for $i \neq j$) | How much of used heat of $R_j$ is exhausted by $R_i$ | To detect racks which supply considerable heat to used heat of $R_j$ |
| $\mathrm{Inf}(R_i, R_j)/R_j = \dfrac{\dot{Q}(R_i, R_j)}{\dot{Q}^{out}(R_i)}$ (for $i \neq j$) | How much of exhaust heat from $R_i$ is sucked by $R_j$ | To detect racks which receive considerable amount of exhaust heat from $R_j$ |
| $\mathrm{Inf}(R_i, R_i)/R_i^{target} = \dfrac{\dot{Q}(R_i, R_i)}{\dot{Q}^{in}(R_i)}$ | How much of used heat of $R_i$ is exhausted by $R_i$ itself | To detect if a rack receives considerable heat from its own exhaust |
| $\mathrm{Inf}(R_i, R_i)/R_i^{source} = \dfrac{\dot{Q}(R_i, R_i)}{\dot{Q}^{out}(R_i)}$ | How much of exhaust heat from $R_i$ is sucked by $R_i$ itself | To detect if a rack supplies considerable heat to its own inlet |
| $\mathrm{Inf}(R_{All}, R_j)/R_j = \dfrac{\sum_{i=1}^{N} \dot{Q}(R_i, R_j)}{\dot{Q}^{in}(R_j)}$ | How much of used heat of $R_j$ is exhausted by all racks | To detect contribution of recirculated heat in used heat of $R_j$ |
| $\mathrm{Inf}(R_i, R_{All})/R_i = \dfrac{\sum_{j=1}^{N} \dot{Q}(R_i, R_j)}{\dot{Q}^{out}(R_i)}$ | How much of exhaust heat from $R_i$ is sucked by all racks | To detect extent of recirculation of exhaust heat from $R_i$ |
| $\mathrm{Inf}(R_i, R_j)/(R_{All}, R_j) = \dfrac{\dot{Q}(R_i, R_j)}{\sum_{i=1}^{N} \dot{Q}(R_i, R_j)}$ | How much of exhaust heat from all racks sucked by $R_j$ is exhausted by $R_i$ | To compare different racks with respect to influence over $R_j$ |
| $\mathrm{Inf}(R_i, R_j)/(R_i, R_{All}) = \dfrac{\dot{Q}(R_i, R_j)}{\sum_{j=1}^{N} \dot{Q}(R_i, R_j)}$ | How much of exhaust heat of $R_i$ sucked by all racks is sucked by $R_j$ | To compare different racks with respect to influence of $R_i$ |

Some of the indices with source component and target component as CRACs will now be explained. This set of indices quantifies how much supply of an individual or group of CRACs influence inlets of an individual or group of CRACs. It includes a special case of influence of a given rack on itself. Some of the useful indices are explained in Table 4.

TABLE 4

| Index and definition | Typical meaning | Example use |
|---|---|---|
| $\mathrm{Inf}(C_i, C_j)/C_j = \dfrac{\dot{Q}(C_i, C_j)}{\dot{Q}^{in}(C_j)}$ (for $i \neq j$) | How much of return heat of $C_j$ is supplied by $C_i$ | To detect CRACs which supply considerable amount to return heat of $C_j$ |
| $\mathrm{Inf}(C_i, C_j)/C_j = \dfrac{\dot{Q}(C_i, C_j)}{\dot{Q}^{out}(C_i)}$ (for $i \neq j$) | How much of supply heat from $C_i$ is sucked by $C_j$ | To detect CRACs which receive considerable amount of supply heat from $C_i$ |
| $\mathrm{Inf}(C_i, C_i)/C_i^{target} = \dfrac{\dot{Q}(C_i, C_i)}{\dot{Q}^{in}(C_i)}$ | How much of return heat of $C_i$ is supplied by $C_i$ itself | To detect if a CRAC receives considerable heat from its own supply |
| $\mathrm{Inf}(C_i, C_i)/C_i^{source} = \dfrac{\dot{Q}(C_i, C_i)}{\dot{Q}^{out}(C_i)}$ | How much of supply heat from $C_i$ is sucked by $C_i$ itself | To detect if a CRAC supplies considerable heat to its own return |

TABLE 4-continued

| Index and definition | Typical meaning | Example use |
| --- | --- | --- |
| $\mathrm{Inf}(C_{All}, C_j)/C_j = \dfrac{\sum_{i=1}^{N} \dot{Q}(C_i, C_j)}{\dot{Q}^{in}(C_j)}$ | How much of return heat of $C_j$ is supplied by all CRACs | To detect contribution of unused supply heat in return heat of $C_j$ |
| $\mathrm{Inf}(C_i, C_{All})/C_i = \dfrac{\sum_{j=1}^{N} \dot{Q}(C_i, C_j)}{\dot{Q}^{out}(C_i)}$ | How much of supply heat from $C_i$ is sucked by all CRACs | To detect extent of wastage of supply heat from $C_i$ |
| $\mathrm{Inf}(C_i, C_j)/(C_{All}, C_j) = \dfrac{\dot{Q}(C_i, C_j)}{\sum_{i=1}^{N} \dot{Q}(C_i, C_j)}$ | How much of unused supply heat from all CRACs sucked by $C_j$ is supplied by $C_i$ | To compare different CRACs with respect to influence over $C_j$ |
| $\mathrm{Inf}(C_i, C_j)/(C_i, C_{All}) = \dfrac{\dot{Q}(C_i, C_j)}{\sum_{j=1}^{N} \dot{Q}(C_i, C_j)}$ | How much of unused supply heat of $C_i$ sucked by all CRACs is sucked by $C_j$ | To compare different CRAC with respect to influence of $C_i$ |

Above tables define only some of the indices and explain their typical meanings and illustrate with an example. These indices may be analyzed in other ways to extract different understanding about cooling characteristics of the data center and hence may have different uses.

Similarly as a part of this invention many other useful indices e.g. Influence of CRAC on cold tile, cold tile on rack, rack on hot tile, hot tile on CRAC, CRAC on temperature sensor at rack inlet etc can be defined.

The indices which quantify influence of CRAC on cold tiles may be used to detect the cold tiles which receive supply heat of a given CRAC. This is anther way of determining region of influence of supply of a CRAC.

The indices which quantify influence of cold tile on rack detect the cold tiles which supply cold air to a given rack. This index can be used to determine the degree to which the inlet of the rack is influenced by closest tiles.

The indices related to influence of rack on hot tile detect the racks which supply hot exhaust to a given hot tile. These indices can be used determine to the efficiency of exhaust heat extraction of the cooling infrastructure. This also can be used to quantify the amount of unused supply heat passing through hot tiles.

The influence indices can be defined to quantify influence of CRAC or racks on any point in space in data center. This set of indices quantifies the influence of CRAC supply and racks exhaust on a given point/location in space in the data center. An example of utility of this type of indices is to determine the influence of supply of a given CRAC on a temperature sensor, which may be placed at a strategic position so as to detect a probable hot spot.

According to the present invention, many such indices can be defined by considering servers, group of racks, racks rows, group of CRAC, group of tiles etc and also by choosing different numerators and denominators according to the kind of information that is expected from indices. These indices can be analyzed individually or further processed by normalization.

Figure 7:
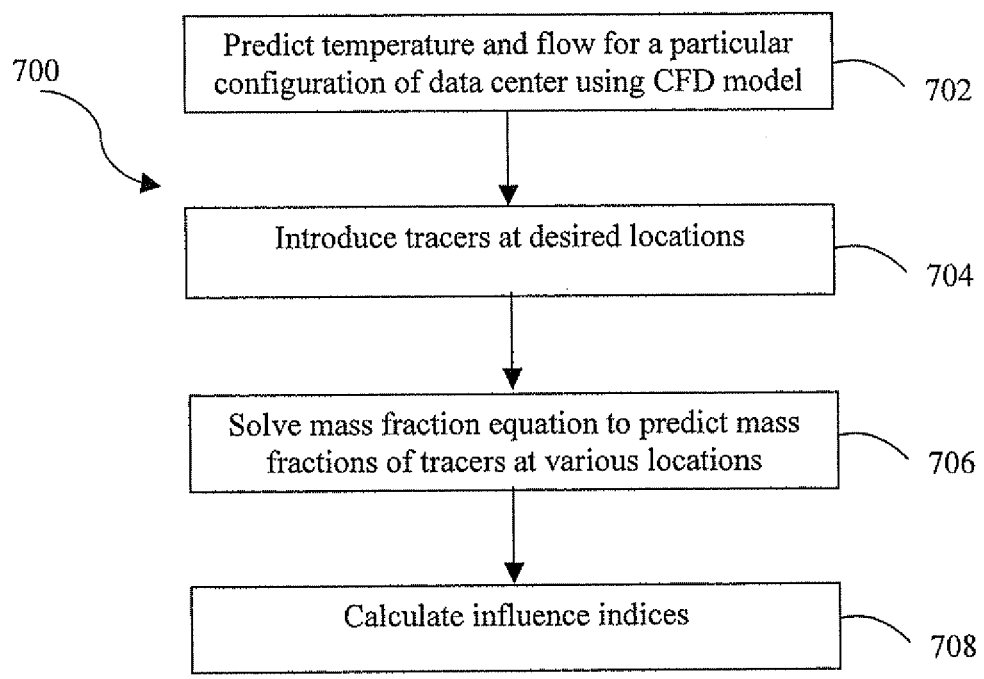

In one of the embodiments of the invention, influence indices are quantified using air tracer method. Referring to FIG. 7 is a flow diagram showing a process 700 for air tracer method which is used to quantify influence indices. The process starts with step 702 in which computational fluid dynamics (CFD) or similar numerical simulations for the chosen configuration of data center are carried out. These CFO simulations solve the conservation equations such as conservation of mass, energy, momentum etc. The method to solve these equations can be programmed on any programming language such as FORTRAN etc or any licensed packages such as Ansys CFX™ may be used. These simulations predict flow and temperatures in the data center. In the next step 704, passive air tracers are strategically introduced at desired locations in the CFD model. These tracers have all the material properties same as that of air. The method of introduction of air tracers depends upon the influence index to be calculated and its particular definition chosen. The air tracers are typically introduced at the outlets of source components such as outlets of CRAC, outlet of racks etc or at the tiles. The mass fraction of air tracer at these locations is set at one. Any number of air tracers can be introduced at a time. The mass fractions of air tracers are detected at inlets of target components such as inlet of racks, inlets of CRAC or a point in space. In the next step 706, the equations of conservation of mass fractions are solved. As air tracers are passive, the mass fractions can be solved from known airflows from CFD model, as a post-processing step. Mass fractions of these air tracers are detected at inlets of desired target components. E.g. Air tracer introduced at outlet of a rack may travel to inlet of a CRAC or may get sucked at inlet of another rack. So, mass fractions of this tracer in this case are detected at inlets of CRACs and racks. The provision is to be made in the CFD model such that once a tracer is sucked by an inlet of a rack; the tracer doesn't appear at the exhaust of the rack. Similar appropriate provisions need to be made in the model for other types of indices. As different tracers are used for different source components, the mass fraction equation for all the tracers can be solved simultaneously. In the next step 708, the influence indices are calculated from mass fractions obtained at desired target locations, airflows and temperatures predicted by CFD model at various locations.

To illustrate the process of quantification of influence indices using air tracer method, calculation of influence of $C_1$ on $R_2$ is carried out by introducing air tracer named as $\mathrm{Tracer}C_1$ at the outlet of $C_1$. This index can be calculated using Equation (5) stated below:

$$Inf(C_1, R_2)/R_2 = \frac{Q(C_1, R_2)}{Q^{in}(R_2)} \quad \text{Equation (5)}$$
$$= \frac{\dot{m}(C_1, R_2) \times T^{out}(C_1)}{\dot{m}^{in}(R_2) \times T^{in}(R_2)}$$

The mass flow $\dot{m}(C_1,R_2)$ can be calculated using Equation (6) stated below:

$\dot{m}(C_1,R_2)=\dot{m}^{in}(R_2)\times$(Mass fraction of Tracer$C_1$ at inlet of $R_2$)  Equation (6)

Similarly, other influence indices may be calculated from appropriate mass fractions, airflows and temperature information.

Figure 8:
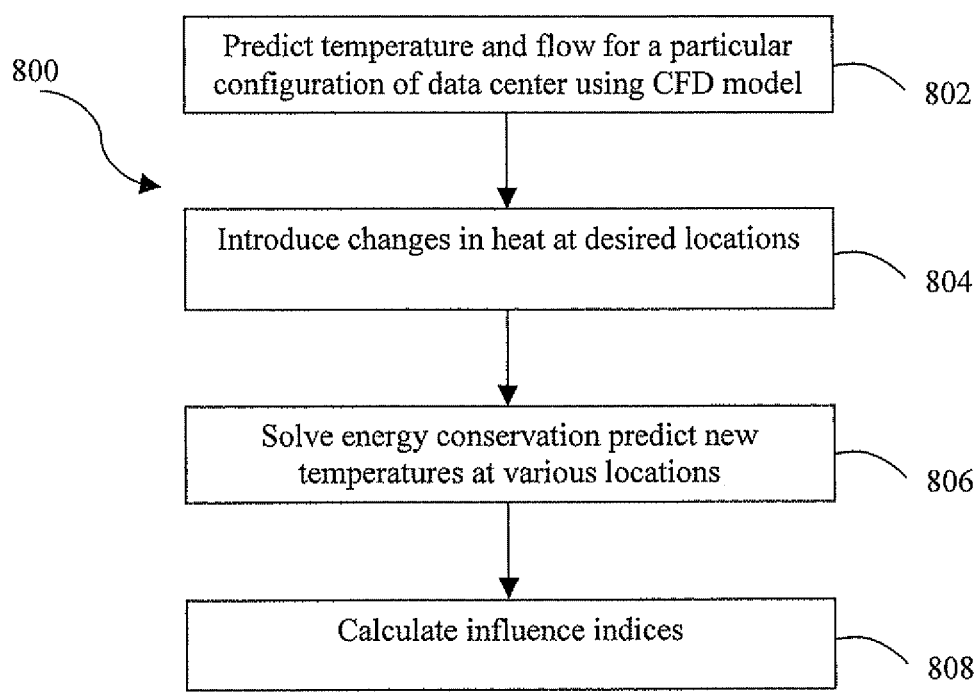

In an alternative embodiment of the invention, heat tracer method is used to quantify the influence indices. This method is similar to the air tracer method except that heat is used as a tracer. The FIG. 8 shows the process 800 for heat tracer method. Similar to air tracer method, this method starts with prediction of flow and temperatures in the data center using CFD model in the step 802. In the next step 804, a step change is made in the heat (or temperature) at outlet of source component, for example, a change in supply temperature of a CRAC. As heat is used as the only tracer, the step change is to be introduced at only one source component at a time. Only heat conservation equation is again solved in the step 806 to predict new temperatures at various locations. The provision is to be made in the CFD model to ensure that the step change made in the source component affects heat conditions at only inlets of target component and the heat conditions at the outlets of the target components should remain unchanged. In this way, the propagation of this step change in the data center and its effect on different components in the data center is studied. The heat conditions of the target components after step change are compared with those of the obtained in step 802. The influence indices are then calculated in step 808 using ratio of change in heat conditions of the target component to the step change made in heat conditions of the source component.

To illustrate the process of quantification of the influence indices using heat tracer method, calculation of influence of $C_1$ on $R_2$ is carried out by introducing a step change in the supply temperature of $C_1$. Mass flow supplied by $C_1$ to $R_2$ is then calculated using Equation (7) stated below:

$$\dot{m}(C_1, R_2) = \frac{\text{Change in temperature at inlet of } R_2}{\text{Change in temperature at outlet } of_1 C} \quad \text{Equation (7)}$$

This mass flow is substituted in Equation (5) to obtain the influence index. The only drawback of this method is that only one source component can be considered at a time.

There may be several other methods for quantifying influence indices. In an alternative embodiment of the invention, instead of passive tracers used in the air tracer method, massless particles can be injected in the CFD model from the source component and received at target component. The influence indices must be defined in terms of number of particles. The only prerequisite is that particles should not affect airflow and should exactly follow airflow streamlines.

In an alternative embodiment of the invention, in-situ temperature and flow measurements can also be used to quantify the indices. The heat tracer method explained above has to be modified and then used to calculate influence indices using in-situ measurements in an actual data center. Thermal simulators can also be used for simulating the actual conditions and then carrying out measurements. The quantified influence indices are normalized for better comparative analysis.

In a specific embodiment of the invention, $Inf(C_{All},R_j)/R_j$ indices quantified for many racks can be normalized to scale of 1, 2 and 3. 3 denotes the higher values of index which means lowest chance of hot spot. $Inf(C_i,R_j)/(C_i,R_{All})$ for all the racks can be better analyzed by normalizing to the scale of 0 to 1. Many similar methods can be used for easy and better comparative analysis.

In another embodiment of the invention, the calculations and normalizations of influence indices are automated using any programming languages or tools such as Microsoft Excel™. Using Excel, a display screen can be developed which shows influence indices in a convenient manner. For example, the normalized indices may be displayed with appropriate colors such as red for low, green for medium and blue for high. A visual tool can also be developed. This tool will show supply influence and return influence regions of CRAC, comparative dominance of different CRAC on racks, racks affected by recirculating air etc. The tool can be automated to detect causes behind hot spots, cooling inefficiencies etc.

The influence indices are dependent on airflow and temperature. They typically are altered to a large extent after changing design parameters. Amongst operating parameters, the indices typically have strong dependence on CRAC supply flow rate and supply temperature and have secondary dependence on rack flow rates and rack power consumption.

Influence indices can be used to solve some of the cooling related issues faced in data centers. Note that following discussion only illustrates the generalized processes to be used in case of each application. Those processes may need some modification, some parts may be added, removed or the process may be used iteratively while actual use.

Figure 9:
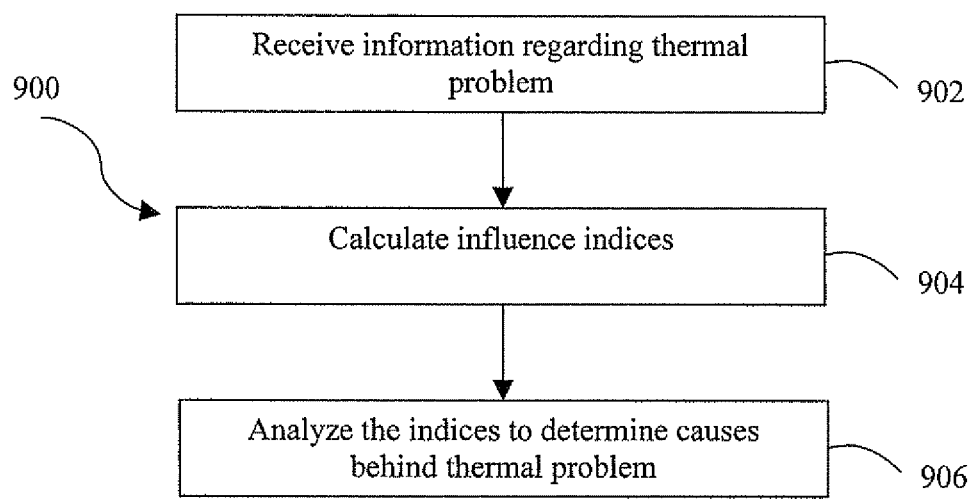

In another embodiment of the invention, causal analysis of a thermal problem is done. Problems related to thermal management such as hot spots, cold spots, cold air short-circuiting etc are often experienced in the data centers. The causes behind such problems can be exactly identified using appropriate influence indices. The FIG. 9 shows the process 900 to be adopted to do the causal analysis of a thermal problem. In the first step 902, exact thermal problem is identified and related information is gathered. Accordingly, the influence indices to be analyzed are selected. In the next step 904, the corresponding influence indices are calculated. In the next step 906, appropriate indices are analyzed to detect the cause behind the thermal problem.

Figure 10:
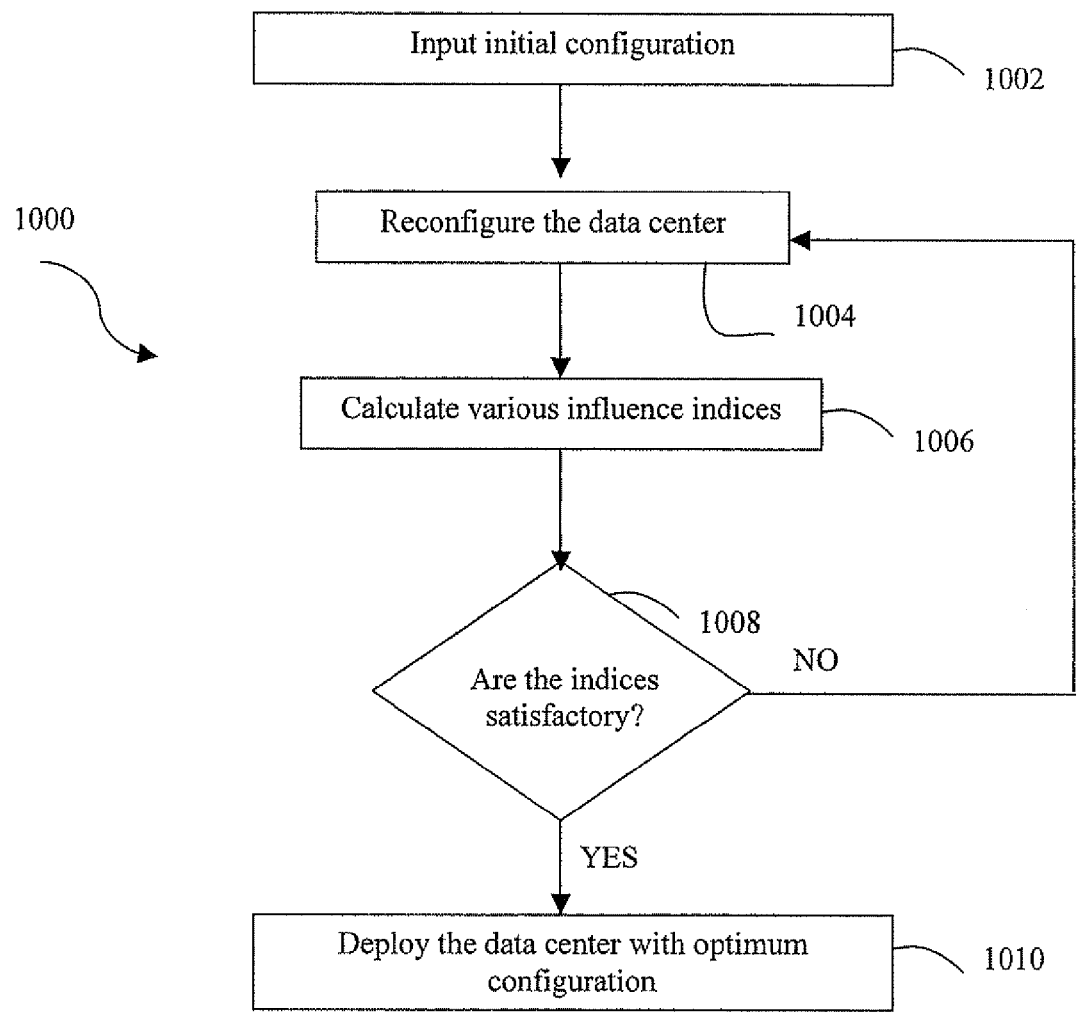

In another embodiment of the invention, configuration of data center is optimized. The optimization may be carried out for designing a new data center or for transformation of an existing data center. The configuration of the data center involves placement of racks, CRAC and tiles, heat load distribution among racks, plenum depth and various similar design parameters and operating parameters such as temperature and flow set-points etc. There can be various constraints on the configuration due to various reasons such as design of the room (e.g. maximum plenum depth allowed), type of cooling infrastructure, constraints set by network and power topology etc. Referring to FIG. 10 is a flow diagram showing the process 1000 to be adopted for this optimization. In the first step 1002, an initial configuration of the data center is selected. This may be a guessed configuration for a new data center or the existing configuration of an old data center. In the step 1004, the data center is reconfigured. It is ensured that the new configuration satisfies all the constraints. The process 900 explained above can be used to exactly determine the causes behind unsatisfactory cooling performance and hence give guidelines for reconfiguration. In the step 1006, various influence indices are calculated using methods explained above. In the next step 1008, the calculated indices are analyzed. The indices may be compared with some threshold. The indices may be compared with couple of thresholds so that they can be classified as 'good', 'average', 'bad'. If the indices are not satisfactory, then the outcome of the step 1008 is NO. The process then returns to step 1004. If the output of the step 1008 is YES, then the current configuration is meeting the expectations and hence it is a satisfactory configuration. The process then ends at step 1012.

Figure 11:
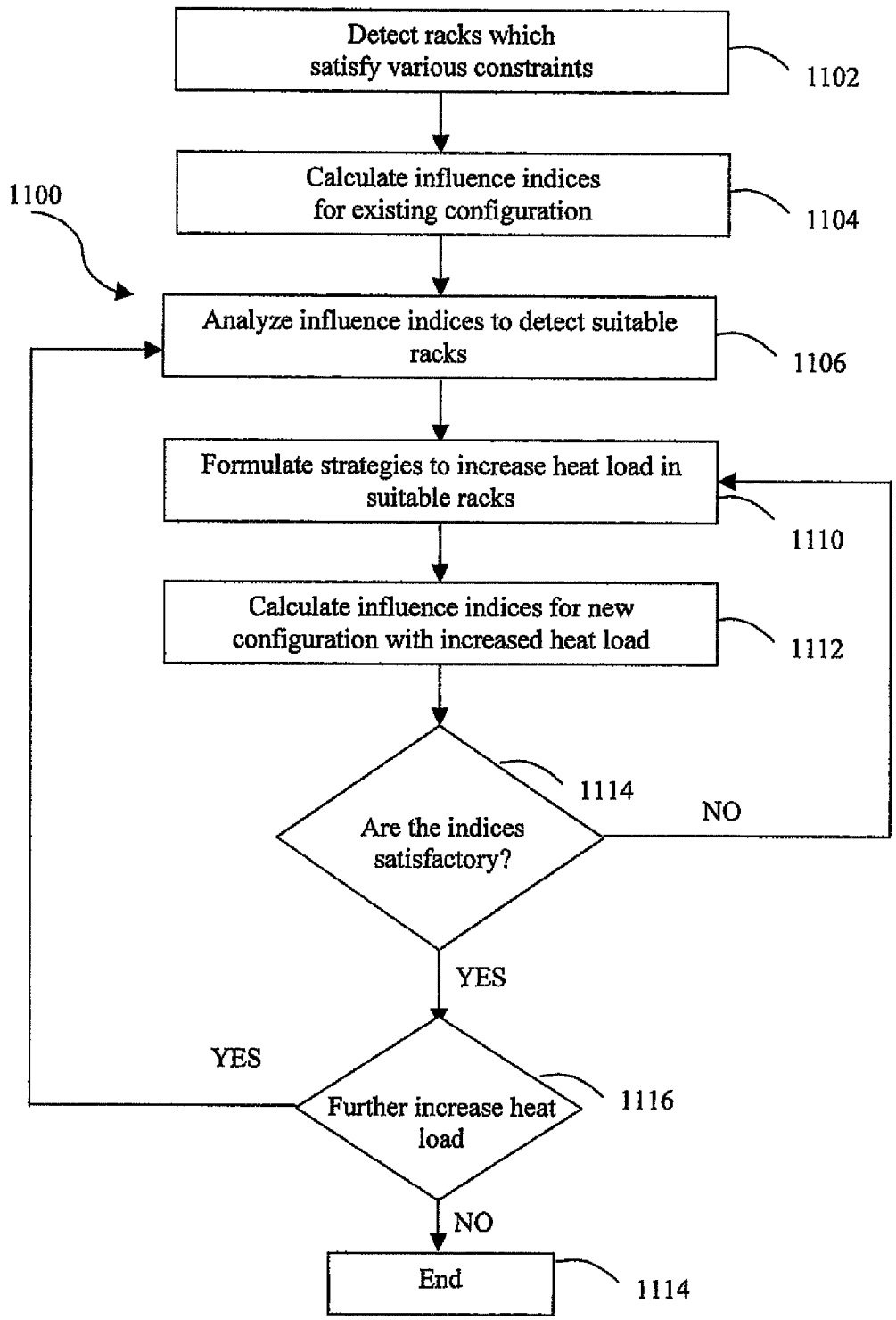

In yet another embodiment of the invention, evaluation of existing cooling infrastructure for its capacity to take up these higher heat loads is done. Heat loads in the data center may increase because of addition of new servers, replacement of old servers with new high powered servers, increasing capacity of power equipments, consolidation etc. The existing cooling infrastructure needs to be evaluated for its capacity to take up these higher heat loads. This process of evaluation aims at finding possibilities of increasing heat load and the suitable places in the data center without causing problems such as hot spots or overloading of CRAC and ensuring optimum cooling efficiency. The process finds suitable racks which will receive enough cold air to cool the increased heat loads. These racks should not affect inlet temperatures of other racks excessively. The CRACs being influenced by these racks should not be overloaded. The process also takes into account the various constraints which may be set because of various reasons e.g. network and power topology. Referring to FIG. 11 is a flow diagram showing process 1100 which is used for this evaluation. The process starts with step 1102 which involves detecting racks in the existing configuration which are suitable under various constraints other than cooling. In the next step 1104, calculations of selected influence indices for existing configuration are carried out. In the next step 1106, these influence indices are analyzed and racks which are suitable under all the constraints including cooling constraints are detected. In the next step 1108, exact strategy is decided to increase heat load distribution in the suitable racks. These strategies will choose between different possible sets of suitable racks and quantity of heat load to be added in those racks from the analysis of influence indices. In the next step 1110, a new configuration of the data center is defined with the increased heat load according to the chosen strategy. Influence indices are again calculated for this new configuration and are analyzed. The indices can be compared against some thresholds. Temperatures at various locations may change after increasing heat load. Some criteria may be defined which will define permissible change in temperatures, for instance allowed increase in rack inlet temperatures. If the outcome of the process is NO, it means that the chosen strategy is not appropriate. Then the process returns to 1108 to reformulate the strategy. If the outcome of this process is YES, it means that new configuration is satisfactory and there may be additional scope for further increasing heat load. The process then proceeds to step 1114 to check whether there is any need to increase heat load further. If the outcome of the step 1114 is YES then the process then returns to step 1106 to detect suitable racks in this new configuration. The process ends if the outcome of the step 1114 is NO.

Figure 12:
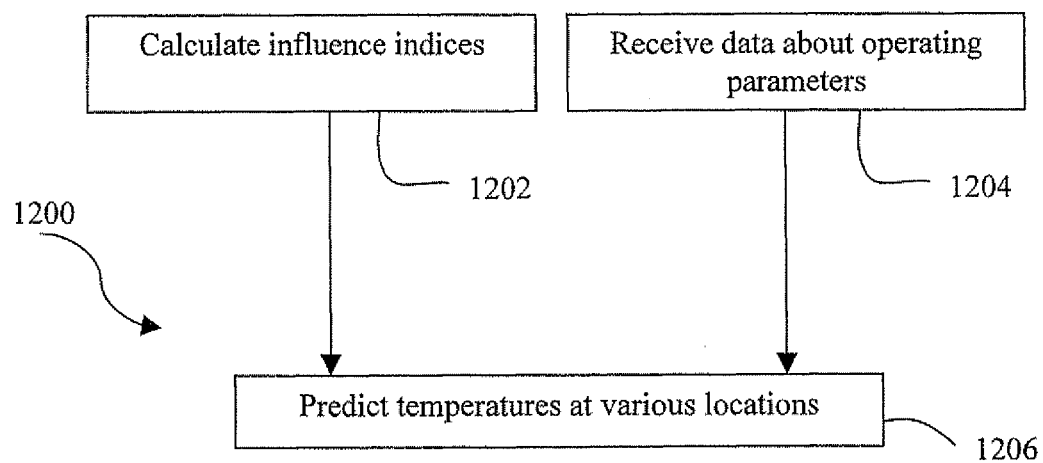

In still another embodiment of the invention, temperature is predicted at various locations in data center. The influence indices are used for fast prediction of temperatures at any point in the data center for different operating conditions such as power consumption of racks, supply temperature and supply flow rates of CRACs etc. The influence indices for some configurations of the data center are used to predict temperatures in the data center with some other configurations. Referring to FIG. 12 is a flow diagram showing the process 1200 to predict temperatures at various locations of the data center from influence indices. The process starts with step 1202 which involves calculation of influence indices for some configurations of the data centers using any of the methods explained above. For example, the influence indices may be calculated for configurations with different CRAC flow rates.

The influence indices are calculated using Equation (8) and (9) stated below:

$$Inf(C_i, Pt)/Pt = \frac{Q(C_i, Pt)}{Q(Pt)} = \frac{m(C_i, Pt) \times T^{out}(C_i)}{m(Pt) \times T(Pt)} \quad \text{Equation (8)}$$

$$Inf(F_f, Pt)/Pt = \frac{Q(R_j, Pt)}{Q(Pt)} = \frac{m(R_j, Pt) \times T^{out}(R_j)}{m(Pt) \times T(Pt)} \quad \text{Equation (9)}$$

The values of influence indices and flow and temperature at various locations in the data center are passed on to step 1206.

The Equation (8) and (9) can be rearranged to obtain Equation (10) and (11) stated below:

$$\frac{m(C_i, Pt)}{m(Pt)} = \frac{T(Pt) \times Inf(C_i, Pt)/Pt}{T^{out}(C_i)} \quad \text{Equation (10)}$$

$$\frac{M(R_j, Pt)}{m(Pt)} = \frac{T(Pt) \times Inf(R_j, Pt)/Pt}{T^{out}(R_j)} \quad \text{Equation (11)}$$

In the step 1204, data about operating conditions such as CRAC supply temperature and flow rate, power consumption of racks, temperatures at various locations etc. are received. This data may be received from the user or from sensors. This data gives information about new configuration of the data center. In the step 1206, the data obtained from step 1204 and 1202 are used to calculate temperatures at various locations in the data center for the new configuration.

The heat flow at any point Pt in the data center can be written in the form of Equation (12) stated below:

$$Q(Pt) = \sum_{i=1}^{M} Q(C_i, Pt) + \sum_{j=1}^{N} Q(R_j, Pt) \quad \text{Equation (12)}$$

Calculating various heat flows in Equation (12) using Equation (1) results in Equation (13) stated below:

$$m(Pt) \times T(Pt) = \sum_{i=1}^{M} m(C_i, Pt) \times T^{out}(C_i) + \sum_{j=1}^{N} m(R_j, Pt) \times T^{out}(R_j) \quad \text{Equation (13)}$$

The Equation (13) can be written in another form shown by Equation (14) stated below:

$$1 = \sum_{i=1}^{M} \frac{m(C_i, Pt) \times T^{out}(C_i)}{m(Pt) \times T(Pt)} + \sum_{j=1}^{N} \frac{m(R_j, Pt) \times T^{out}(R_j)}{m(Pt) \times T(Pt)} \quad \text{Equation (14)}$$

As temperature (or heat) changes, flow is altered because of weak force of buoyancy. The temperature and heat conditions such as CRAC supply temperature and rack power consumption have weak influence on flow conditions. Hence by changing operating parameters such as CRAC supply temperature and rack power consumption, flow can be assumed as unaffected and hence Equation (14) can be rewritten for new configuration as Equation (15) below:

$$1 = \sum_{i=1}^{M} \frac{m(C_i, Pt) \times T_{new}^{out}(C_i)}{m(Pt) \times T_{new}(Pt)} + \sum_{j=1}^{N} \frac{m(R_j, Pt) \times T_{new}^{out}(R_j)}{m(Pt) \times T_{new}(Pt)} \quad \text{Equation (15)}$$

Equations (10) and (11) can be substituted in Equation (15) to obtain Equation (16) below:

$$T_{new}(Pt) = \sum_{i=1}^{M} \left( \frac{T(Pt) \times Inf(C_i, Pt)/Pt}{T^{out}(C_i)} \right) \times T_{new}^{out}(C_i) + \quad \text{Equation (16)}$$

$$\sum_{j=1}^{N} \left( \frac{T(Pt) \times Inf(R_j, Pt)/Pt}{T^{out}(R_j)} \right) \times T_{new}^{out}(R_j)$$

In the Equation (16), T(Pt), Inf($C_i$,Pt)/Pt, $T^{out}(C_i)$, $T^{out}(R_j)$, Inf($R_j$,Pt)/Pt are obtained from step 1202. $T_{new}^{out}(C_i)$ and $T_{new}^{out}(R_j)$ may be obtained from sensors or may be calculated from $T_{new}^{in}(C_i)$ and $T_{new}^{in}(R_j)$ which are calculated using Equation (16).

These equations are solved to obtain new temperature at Pt in case of new configuration of data center. In some cases, solving this equation may need solving a system of linear simultaneous equations which can be done using a method such as Gauss-Seidel method.

Changes such as operating parameters such as CRAC flow rate affect flow conditions drastically. The assumptions done to obtain the Equation (15) may not remain valid. The new flow rates required in Equation (15) can be obtained from influence indices for new CRAC flow rates calculated in step 1202.

Note that as actual CFD calculations are not performed in the step 1206. This step takes very less time as compared to actual CFD modeling. But the assumptions done may introduce some amount of error.

Example of Working of the Invention

An illustration of the method for determining cooling characteristics of the data center will now be explained. An example data center is considered with design as shown in the FIG. 2. The data center has 4 CRACs having 60 kW rated cooling capacity. The CRAC $C_2$ is redundant and hence turned off. Hence total rated running cooling capacity running is 180 kW. The data center has 8 rows of racks placed in hot aisle-cold aisle fashion. The CRACs push cold air into the under floor plenum. This air enters the room through perforated tiles placed in cold aisle as shown. The racks are numbered as shown in the FIG. 2. The heat generation per rack is given in the Table 5. The total heat generation in the data center is 144 kW.

TABLE 5

| Row | kW of every Rack |
|---|---|
| 1 | 1 |
| 2 | 2 |

TABLE 5-continued

| Row | kW of every Rack |
|---|---|
| 3 | 4 |
| 4 | 1 |
| 5 | 2 |
| 6 | 5 |
| 7 | 4 |
| 8 | 5 |

A CFD model of the data center is built using the commercial set of CFD tools Ansys CFX™ The geometry of the data center is meshed with 0.18 nm hexahedral volumes. For simplicity, only room and plenum volume is meshed and not the CRAC and rack volumes. For simplicity, each rack is assumed to have 3 groups of servers of equal sizes each consuming $\frac{1}{3}^{rd}$ of total rack power. Inlet and outlet of each part of rack are specified as outflow and inflow boundary condition respectively. The flow rate through these boundaries is calculated so as to give 12° C. temperature rise between inlet and outlet. Each part of rack outlet is given a heat source boundary condition corresponding to maximum power usage of the part. Inflow and outflow conditions are specified at CRAC outlet and inlet respectively. CRAC supply temperature of 16° C. and flow rate of 5.974 m³/s are specified at all running CRAC outlets. Each tile is considered to have 50% opening and corresponding pressure drop is specified across the tile.

The air tracer method is used to calculate various influence indices. Tracers are introduced at all CRAC outlets and racks outlets. No specific normalization method is used. Analysis of some of the influence indices is explained in the Table 6.

TABLE 6

| Index | Value | Analysis/use |
|---|---|---|
| Inf ($C_3$, $R_{23}$)/$R_{23}$ | 0.97 | Most of the used heat of $R_{23}$ is supplied by $C_3$ |
| Inf ($C_1$, $R_{75}$)/($C_{All}$, $R_{75}$) | 0.60 | $C_1$ has more influence on $R_{75}$ than $C_3$ |
| Inf ($C_3$, $R_{75}$)/($C_{All}$, $R_{75}$) | 0.37 | |
| Inf ($C_{All}$, $R_{74}$)/$R_{74}$ | 0.65 | This much fraction of used heat of $R_{74}$ has originated from CRACs and rest is recirculated heat. Hence this is a probable hot spot |
| Inf ($C_4$, $R_{All}$)/$C_4$ | 0.63 | This much fraction of the supply heat of $C_4$ is used by racks and rest is unused |
| Inf ($R_{21}$, $C_3$)/$R_{21}$ | 0.98 | Most of the exhaust heat of $R_{21}$ returns to $C_3$ |
| Inf ($R_{All}$, $C_1$)/$C_1$ | 0.79 | This much fraction of return heat of $C_1$ is exhausted by racks and rest is unused supply heat |
| Inf ($R_{85}$, $R_{All}$)/$R_{85}$ | 0.23 | This much fraction of exhaust heat of $R_{85}$ recirculates to other racks |
| Inf ($C_3$, $C_3$)/$C_3^{source}$ | 0.34 | This much fraction of supply heat of $C_3$ is unused and returns to its own return |

It can be seen from the Table 6 that that, plenty of useful information about cooling characteristics can be obtained from appropriate influence indices.

An illustration of the method for carrying out causal analysis of a thermal problem described now. In the example data center used above, maximum temperature at rack inlets of 19.6° C. is detected at inlet of $R_{84}$. The cause behind this is analyzed as explained in the Table 7.

TABLE 7

| Index | Value | Analysis |
|---|---|---|
| Inf $(C_{All}, R_{84})/R_{84}$ | 0.64 | This much fraction of used heat of $R_{84}$ originates from CRACs. Rest comes from exhausts of other racks |
| Inf $(R_{84}, R_{84})/R_{84}$ | 0.07 | Racks $R_{84}$, $R_{85}$ and $R_{86}$ contribute to hot air recirculation occurring at $R_{84}$ |
| Inf $(R_{85}, R_{84})/R_{84}$ | 0.14 | |
| Inf $(R_{86}, R_{84})/R_{84}$ | 0.07 | |

In this way, exact cause behind the higher temperature which us hot air recirculation from some of the racks is detected by analyzing influence indices.

An illustration of process of design optimization of the data center is explained now. The initial configuration of the data center is taken same as the example data center used above. The main constraint on redistributing heat load is that the racks in each row are always to be kept together. While optimizing configuration of the data center, objectives are set that recirculation must be minimized to avoid hot spots at inlets of racks and the cooling provided by CRAC should be maximally used. So, the index Inf$(C_{All}, R_j)/R_j$ is calculated for all the racks to quantify degree of hot air recirculation and Inf$(C_i, R_{All})/C_i$ is calculated for all CRACs to quantify the degree of cold air utilization. The threshold value is kept as 0.75 for Inf$(C_{All}, R_j)/R_j$ and 0.6 for Inf$(C_i, R_{All})/C_i$. The data center is reconfigured within various constraints in variety of ways such as changing on/off status of CRACs, changing heat load distribution etc. Table 8 gives details about first 3 iterations of the optimization process.

TABLE 8

| Iteration No. | Details | Are constraints satisfied? | Min (Inf $(C_{All}, R_j)/R_j$) | Min (Inf $(C_i, R_{All})/C_i$) | All indices satisfactory? |
|---|---|---|---|---|---|
| 1 | Heat load distribution from Table 5 CRAC $C_2$ off | Yes | 0.64 | 0.59 | No |
| 2 | Heat load distribution from Table 5 All CRACs on | Yes | 0.79 | 0.39 | No |
| 3 | Heat load distribution from Table 9 CRAC $C_2$ off | Yes | 0.81 | 0.61 | Yes |

TABLE 9

| Row | kW of every Rack |
|---|---|
| 1 | 5 |
| 2 | 2 |
| 3 | 4 |
| 4 | 4 |
| 5 | 5 |
| 6 | 2 |
| 7 | 1 |
| 8 | 1 |

The configuration obtained in iteration 3 is satisfactory. The process can be continued for searching for more satisfactory configurations.

An illustration for process of evaluation of existing cooling infrastructure for its capacity to take up these higher heat loads explained here. The configuration of the data center is same as the example data center considered above, CRAC $C_2$ is kept off. Analysis of constraints other than cooling detected Row$_2$, Row$_3$ and Row$_4$ suitable for increasing heat load. Analysis of influence indices for the existing configuration detected suitable racks satisfying cooling constraints in these rows as shown in Table 10. These racks are detected by keeping threshold value as 0.95 for Inf$(C_{All}, R_j)/R_j$. Different strategies are tried and influence indices are analyzed for the new configuration with increased heat load. The threshold value for Inf$(C_{All}, R_j)/R_j$ is kept as 0.75 for Inf$(C_{All}, R_j)/R_j$ and 1° C. of temperature change at rack inlets was allowed over existing configuration to decide suitability of the strategy. The Table 11 gives details about first two iterations of the evaluation process.

TABLE 10

| | Suitability | | |
|---|---|---|---|
| Rack no | Row$_2$ | Row$_3$ | Row$_4$ |
| 1 | Yes | No | Yes |
| 2 | Yes | Yes | Yes |
| 3 | Yes | Yes | Yes |
| 4 | Yes | Yes | Yes |
| 5 | Yes | Yes | Yes |
| 6 | No | No | Yes |

TABLE 11

| Iteration No. | Heat load distribution | Total heat load added (kW) | Min (Inf $(C_{All}, R_j)/R_j$) | Max (change in temperatures at rack inlets) | All indices satisfactory? |
|---|---|---|---|---|---|
| 1 | See Table 12 | 10 | 0.68 | 1.3 | No |
| 2 | See Table 13 | 10 | 0.74 | 0.9 | Yes |

TABLE 12

| | Heat load (kW) | | |
|---|---|---|---|
| Rack no | Row$_2$ | Row$_3$ | Row$_4$ |
| 1 | 2 | 4 | 4 |
| 2 | 3 | 4 | 4 |
| 3 | 4 | 5 | 5 |
| 4 | 4 | 5 | 5 |
| 5 | 3 | 4 | 4 |
| 6 | 2 | 4 | 4 |

TABLE 13

| | Heat load (kW) | | |
|---|---|---|---|
| Rack no | Row$_2$ | Row$_3$ | Row$_4$ |
| 1 | 2 | 4 | 4 |
| 2 | 3 | 4 | 4 |
| 3 | 4 | 5 | 5 |
| 4 | 3 | 6 | 5 |
| 5 | 2 | 5 | 4 |
| 6 | 2 | 4 | 4 |

The strategy used in iteration no.2 is satisfactory. The process can be continued for detection of suitable racks in this new configuration to increase heat bad further.

An illustration of the above process is explained here. The necessary influence indices are calculated in case of the configuration with design as shown in FIG. 2, with heat load distribution given in Table 1 and with CRAC $C_2$ off. All running CRAC supply temperature is kept at 16° C. In this case. An arbitrary point Pt is placed in the data center. The data about T(Pt), Inf($C_i$,Pt)/Pt, $T^{out}(C_i)$, $T^{out}(R_j)$, Inf($R_j$,Pt)/Pt is noted. A new configuration out is modeled with supply temperature of all running CRACs at 20° C. Data about $T_{new}^{out}(C_i)$ and $T_{new}^{out}(R_j)$ is noted. All this data is used to calculate the temperature at Pt. The deviation between predicted temperature and actual temperature is 0.3° C.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

We claim:

1. A method for facilitating thermal management of a data center comprising a plurality of components, the method comprising:

selecting, by a processor having a non-transitory computer readable storage, a source component and a target component from the plurality of components, wherein the source component is selected from the group consisting of tiles, parts of racks, cooling units and flow generating devices, and the target component is selected from the group consisting of tiles, parts of racks, sensors, cooling units, and flow generating devices;

defining, by the processor, influence indices for the source component and the target component, wherein the influence indices correspond to a pre-defined parameter of a plurality of pre-defined parameters, wherein the pre-defined parameters include design parameters and operational parameters, the design parameters and the operational parameters being related to cooling infrastructure, cooling units, parts of racks, heat generating equipment, and air flow altering components, the design parameter include configuration of the data center, and the operational parameters include air flow, power consumption by the source component and by the target component, and temperature and heat pertaining to the source component and the target component, quantifying, by the processor, the influence indices using a quantification method to obtain quantified influence indices, normalizing the quantified influence indices into a pre-defined scale to obtain normalized influence indices;

comparing, by the processor, the normalized influence indices with a predefined influence index;

determining, by the processor, cooling characteristics of the source component and the target component based upon the comparison, wherein the cooling characteristics include at least one of hot air recirculation, cold air short-circuiting, loading of the source component and of the target component, and influence region of the source component and of the target component;

identifying, by the processor, thermal inefficiencies associated with the source component and in the target component using the cooling characteristics; and optimizing configuration of the data center based upon the thermal inefficiencies, thereby facilitating thermal management of the data center.

2. The method as claimed in claim 1, wherein the quantifying the influence indices further includes predicting temperature at various locations in the data center based upon the pre-defined parameter.

3. The method as claimed in claim 1, wherein the influence indices are non-dimensional numbers.

4. The method as claimed in claim 1, wherein each of the influence indices is a function of one of heat flow between the source component and the target component, flow rate of air from the source component to the target component, and temperature of the source component and of the target component.

5. The method as claimed in claim 1, wherein the pre-defined influence index is a threshold value.

6. The method as claimed in claim 1, wherein the quantification method is selected from the group consisting of air tracer method, heat tracer method, mass-less particles method, and temperature and flow measurement based method.

7. The method as claimed in claim 1, wherein optimization of the configuration of the data center is performed by selectively designing a new data center and transformation of the data center.

8. The method as claimed in claim 1, wherein optimization of the configuration of the data center is performed by changing at least one of the design parameters and the operational parameters.

9. The method as claimed in claim 1, wherein optimizing configuration of the data center is performed by using at least one event including:

changing positions of the source component and the target component;

changing a heat load distribution between the source component and the target component; identifying suitable racks for increased heat load; and changing a depth of a plenum of the data center.

10. A system for facilitating thermal management of a data center, the system comprising:

a processor; and a non-transitory computer-readable memory coupled to the processor, wherein the processor executes program instructions, stored in the memory, to:

select a source component and a target component from the plurality of components, wherein the source component is selected from the group consisting of tiles, parts of racks, cooling units, and flow generating devices, and the tar let component is selected from the group consisting of tiles, parts of racks, sensors, cooling units, and flow generating devices;

define influence indices for the source component and the target component, wherein the influence indices correspond to a pre-defined parameter of a plurality of pre-defined parameters, wherein the predefined parameters include design parameters and operational parameters, the design parameters and the operational parameters being related to cooling infrastructure, cooling units, parts of racks, heat generating equipment, and air flow altering components, the design parameter include configuration of the data center, and the operational parameters include air flow, power consumption by the source component and by the target component, and temperature and heat pertaining to the source component and the target component;

quantify the influence indices using a quantification method to obtain quantified influence indices;

normalize the quantified influence indices into a pre-defined scale to obtain normalized influence indices;

compare the normalized influence indices with a pre-defined influence index;

determine cooling characteristics of the source component and the target component based upon the comparison, wherein the cooling characteristics include hot air recirculation, cold air short-circuiting, loading of the source component and of the target component, and influence region of the source component and of the target component; and identify thermal inefficiencies in the source component and in the target component using the cooling characteristics to optimize configuration of the data center based upon the thermal inefficiencies, thereby facilitating thermal management of the data center.

11. The system as claimed in claim 10, wherein optimization of the configuration of the data center is performed by selectively designing a new data center and transformation of the data center.

12. The system as claimed in claim 10, wherein optimization of the configuration of the data center is performed by changing at least one of the design parameters and the operational parameters.

* * * * *